(12) United States Patent
Bracher et al.

(10) Patent No.: US 10,600,063 B2
(45) Date of Patent: Mar. 24, 2020

(54) REAL-TIME SYSTEM TO IDENTIFY AND ANALYZE BEHAVIORAL PATTERNS TO PREDICT CHURN RISK AND INCREASE RETENTION

(71) Applicant: SAP SE, Walldorf (DE)

(72) Inventors: Shane Bracher, Morningside (AU);
Daniel Ricketts, Toowong (AU);
Asadul Islam, Coorparoo (AU); Liam Mischewski, Brisbane (AU); Mark Holmes, Brisbane (AU); Xiaohua Cao, Shanyin (CN); Glenn Neuber, Red Hill (AU); Karsten Ploesser, Bulomba (AU); Hoyoung Jeung, Tennyson (KR)

(73) Assignee: SAP SE, Walldorf (DE)

( * ) Notice: Subject to any disclaimer, the term of this patent is extended or adjusted under 35 U.S.C. 154(b) by 891 days.

(21) Appl. No.: 15/156,669

(22) Filed: May 17, 2016

(65) Prior Publication Data
US 2017/0337567 A1    Nov. 23, 2017

(51) Int. Cl.
*G06Q 30/00* (2012.01)
*G06Q 30/02* (2012.01)
(Continued)

(52) U.S. Cl.
CPC ......... *G06Q 30/0201* (2013.01); *G06Q 10/04* (2013.01); *H04L 67/02* (2013.01);
(Continued)

(58) Field of Classification Search
None
See application file for complete search history.

(56) References Cited

U.S. PATENT DOCUMENTS

| | | | |
|---|---|---|---|
| 7,340,408 B1 * | 3/2008 | Drew | G06Q 30/02 705/7.33 |
| 7,567,950 B2 | 7/2009 | Kraiss | |

(Continued)

OTHER PUBLICATIONS

'm-centric.com' [online]. "Big Data / Real-Time Data Harvesting," 2000, [retrieved on May 17, 2016]. Retrieved from the Internet: URL<http://www.m-centric.com/web/prodsAndSols_bigData.jsp>. 6 pages.

(Continued)

*Primary Examiner* — Gurkanwaljit Singh
(74) *Attorney, Agent, or Firm* — Fish & Richardson P.C.

(57) ABSTRACT

Implementations are directed to identifying potential churn of a user of one or more computer-implemented systems provided by an enterprise. In some examples, actions include identifying potential churn of providing a plurality of event profiles based on historical data, each event profile being representative of interactions of users with the enterprise and corresponding to churn of the users, at least one event profile being representative of an interaction of users with the one or more computer-implemented services, providing a pulse of the user at least partially based on historical data associated with the user, and one or more event profiles of the plurality of event profiles, and determining that the user is at-risk of churn based on the pulse of the user and a risk index value, and in response, displaying an indication that the user is at-risk of churn in a graphical user interface.

20 Claims, 8 Drawing Sheets

(51) Int. Cl.
    *H04L 29/08*     (2006.01)
    *H04M 15/00*     (2006.01)
    *G06Q 10/04*     (2012.01)
    *H04M 3/51*     (2006.01)

(52) U.S. Cl.
    CPC ............ *H04L 67/10* (2013.01); *H04M 15/43* (2013.01); *H04L 67/12* (2013.01); *H04M 3/5175* (2013.01); *Y04S 10/54* (2013.01); *Y04S 40/18* (2018.05)

(56) References Cited

U.S. PATENT DOCUMENTS

| | | | |
|---|---|---|---|
| 7,848,909 B2 | 12/2010 | Kraiss | |
| 8,069,434 B2 | 11/2011 | Ploesser et al. | |
| 8,249,231 B2 | 8/2012 | Chakraborty et al. | |
| 8,578,330 B2 | 11/2013 | Dreiling et al. | |
| 8,615,419 B2 | 12/2013 | Eilam et al. | |
| 8,630,892 B2 * | 1/2014 | Bhalla | G06Q 30/02 705/7.31 |
| 8,732,595 B2 | 5/2014 | Schmidt et al. | |
| 9,021,423 B2 | 4/2015 | Dreiling et al. | |
| 9,420,100 B2 * | 8/2016 | Bellini | G06Q 10/063 |
| 2004/0215656 A1 * | 10/2004 | Dill | G06Q 30/02 |
| 2010/0223099 A1 * | 9/2010 | Johnson | G06Q 10/04 705/7.28 |
| 2012/0053990 A1 * | 3/2012 | Pereg | G06Q 10/06 705/7.31 |
| 2012/0143735 A1 * | 6/2012 | Pascal Leo | G06Q 30/04 705/34 |
| 2012/0324372 A1 | 12/2012 | Kowalkiewicz et al. | |
| 2013/0054306 A1 * | 2/2013 | Bhalla | G06Q 30/02 705/7.31 |
| 2013/0124258 A1 * | 5/2013 | Jamal | G06Q 30/02 705/7.29 |
| 2013/0227285 A1 | 8/2013 | Bracher et al. | |
| 2014/0040249 A1 | 2/2014 | Ploesser et al. | |
| 2015/0278738 A1 | 10/2015 | Ploesser et al. | |
| 2016/0286410 A1 * | 9/2016 | O'Malley | G06Q 30/06 |
| 2017/0006135 A1 * | 1/2017 | Siebel | H04L 67/02 |
| 2017/0279616 A1 * | 9/2017 | Loeb | H04L 67/22 |

OTHER PUBLICATIONS

'atos.net' [online]. "Good customer and sales insights deliver profitable business," Jan. 2012, retrieved from the Internet: URL<https://atos.net/content/dam/global/we-do/atos-sap-bi-predictive-intelligence.pdf> 4 pages.

* cited by examiner

REAL-TIME SYSTEM TO IDENTIFY AND ANALYZE BEHAVIORAL PATTERNS TO PREDICT CHURN RISK AND INCREASE RETENTION

BACKGROUND

User churn is a concern for enterprises. When a user ceases to interact with an enterprise (e.g. telecommunications, banking, insurance providers, etc.), not only is future revenue lost, but also the initial investment in technical infrastructure, as well as in acquiring the user is lost. For example, technical resources (e.g., servers, memory, bandwidth) are planned, acquired, and maintained based on the number of users using the technical infrastructure (e.g., interacting with the enterprise through web-/mobile-applications, automated call centers, and the like). In general, acquisition costs are higher than is the cost to retain a user. Consequently, enterprises are motivated to mitigate user churn.

SUMMARY

Implementations of the present disclosure are generally directed to processing user data provided through a technological infrastructure to mitigate user churn. More specifically, implementations of the present disclosure are directed to identifying events and/or patterns that occur before user churn based on data provided from one or more computer-implemented systems of an enterprise, through which users interact with the enterprise. In some examples, actions include providing a plurality of event profiles based on historical data, each event profile being representative of interactions of users with the enterprise and corresponding to churn of the users, at least one event profile being representative of an interaction of users with one or more computer-implemented services of the enterprise, providing a pulse of the user at least partially based on historical data associated with the user, and one or more event profiles of the plurality of event profiles, and determining that the user is at-risk of churn based on the pulse of the user and a risk index value, and in response, displaying an indication that the user is at-risk of churn in a graphical user interface. Other implementations of this aspect include corresponding systems, apparatus, and computer programs, configured to perform the actions of the methods, encoded on computer storage devices.

These and other implementations can each optionally include one or more of the following features: each event profile is representative of an event associated with a plurality of churned users, each churned user having performed or experienced the event before churning; each event profile includes an impact score, an influence score, and a days-to-churn for the respective event; the impact score is determined as a number of users that have churned and that are associated with the respective event; the influence score is determined as a ratio of a number of churned users that are associated with the respective event to a total number of users that are associated with the respective event; the days-to-churn is determined based on: for each churned user that is associated with the respective event, the number of days between when the respective event was experienced by the churned user and the date the user churned, and averaging the days-to-churn across all churned users that are associated with the event; and the pulse is determined based on at least one influence score of an event associated with the user.

Implementations of the present disclosure provide one or more advantages. For example, implementations of the present disclosure enable enterprises to examine and drill-down into the historical behavior of an individual user (e.g., in terms of their activities and interactions with the enterprise), and pinpoint the behavior that the customer is currently exhibiting that is indicative of churn. With such information and insights, enterprises can enact retention strategies in a timely manner, and tailor the retention strategies to the user at risk, in an effort to prevent churn. Among other advantages, implementations of the present disclosure provide improvements to underlying technical resources (e.g., servers, memory, bandwidth), through which services are provided to users, and through which users interact with an enterprise. For example, mitigating user churn enables technical resources that are implemented to support user interaction with an enterprise to remain in use. That is, idling of technical resources is mitigated by avoiding user churn.

Further, implementations of the present disclosure enable multiple transactions/events to be combined to enable churn risk scoring based on "complex" events. Implementations also support clustering of users to identify users that exhibit similar behavioral/transactional/event patterns, which patterns can be used for churn prediction and early detection of other users who may start to exhibit the same patterns. Implementations are flexible in terms of filtering support (i.e., not limited to specific attributes—customer demographics, product holdings, etc.), variable risk levels (e.g. multiple risk levels may be defined for different customer groups), types of data sources, and/or event types.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
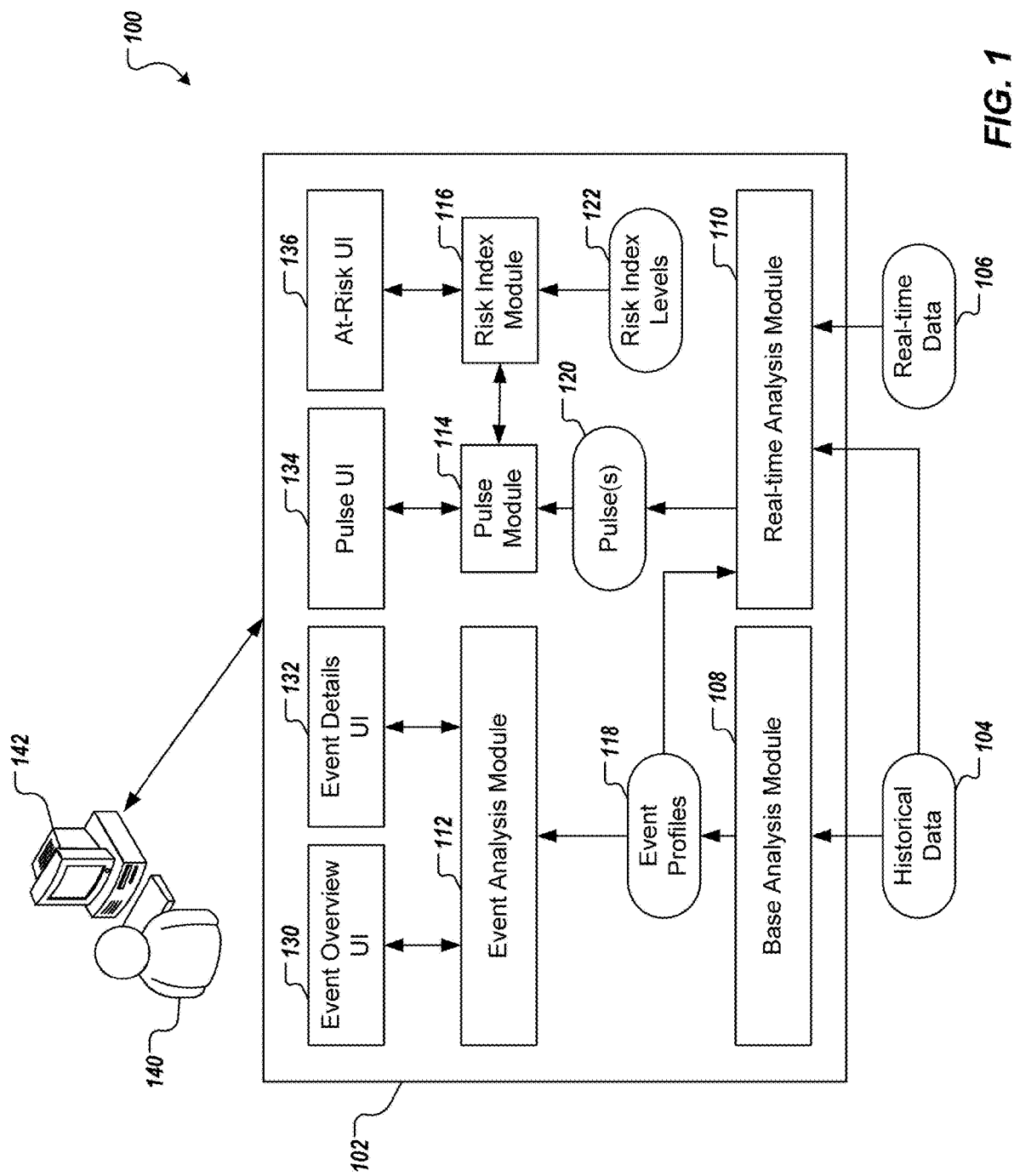
FIG. 1 depicts an example system architecture for executing implementations of the present disclosure.

Implementations of the present disclosure are generally directed to processing user data provided through a technological infrastructure to mitigate user churn. More specifically, implementations of the present disclosure are directed to identifying events and/or patterns that occur before user churn based on data provided from one or more computer-implemented systems of an enterprise, through which users interact with the enterprise. Implementations of the present disclosure provide alerts that indicate potential user churn to enable, for example, action to be taken in an effort to prevent occurrence of user churn. In some implementations, the user is a user of products and/or services provided by an enterprise. For example, the enterprise provides one or more products and/or services that are provisioned using an underlying technical platform (e.g., web-based application, mobile application, cloud system, etc.), and the user consumes the products and/or services using the technical platform.

As described herein, implementations of the present disclosure apply data analysis techniques to examine historical data records and identify user behavioral patterns that are indicative of churn. The results are applied and compared with current data records (e.g., real-time data) to determine and detect current behaviors that correspond to historical behavioral patterns indicative of churn. In this manner, implementations of the present disclosure use data analysis to identify indicators of potential churn of current users. Implementations of the comparison analysis provides a pulse, which indicates a timeline of predicted churn risk scores unique for each customer. In some examples, a pulse provides the enterprise with deeper insight into the behaviors of their users, and identifies anomalies in a user's usual behavior. In some examples, when the pulse achieves a predetermined risk level (e.g., as specified by the enterprise), an alert is triggered to inform the enterprise that the user is displaying signals that are indicative of churn.

Implementations of the present disclosure enable enterprises to examine and drill-down into the historical behavior of an individual user (e.g., in terms of their activities and interactions with the enterprise), and pinpoint the behavior that the customer is currently exhibiting that is indicative of churn. With such information and insights, enterprises can enact retention strategies in a timely manner, and tailor the retention strategies to the user at risk, in an effort to prevent churn. Among other advantages, implementations of the present disclosure provide improvements to underlying technical resources (e.g., servers, memory, bandwidth), through which services are provided to users, and through which users interact with an enterprise. For example, mitigating user churn enables technical resources that are implemented to support user interaction with an enterprise to remain in use. That is, idling of technical resources is mitigated by avoiding user churn.

FIG. 1 depicts an example system architecture 100 for executing implementations of the present disclosure. In the depicted example, the system architecture 100 includes a user churn analysis system 102, a historical data source 104, and a real-time data source 106. The user churn analysis system 102 includes a base analysis module 108, a real-time analysis module 110, an event analysis module 112, a pulse module 114, and a risk index module 116. In some examples, each module and/or sub-module is provided as one or more computer-executable programs executed by one or more computing devices. As described in further detail herein, the user churn analysis system 102 provides event profiles 118, pulses 120, and risk index levels 122. The user churn analysis system 102 provides an event overview user interface (UI) 130, an event details UI 132, a pulse UI 134, and an at-risk UI 136.

In some examples, a user 140 (e.g., an administrator of an enterprise seeking to reduce user churn) can interact with the user churn analysis system 102 using a computing device 142. For example, the computing device 142 can provide/execute the user churn analysis system 102. As another example, the user churn analysis system 102 can be provided by a server system, and the computing device 142 interacts with the server system over a network (e.g., WAN, LAN, Internet).

In some implementations, the event analysis module 112 provides event output data based on the event profiles 118. In some examples, the event analysis module 112 reads the event profiles 118 (e.g., provided as computer-readable files), and processes the event profiles 18 to provide the event output data. In some examples, the output data is provided to the event overview UI 130, and the event detail UI 132, which respectively process the event output data to provide an overview, an in-depth view, and event details (e.g., graphical representations of each). In some implementations, the event overview UI 130 enables the end user to examine overview details based on events. For example, events can be grouped into categories, and/or can include respective impact score, and influence score, discussed in further detail herein. In some implementations, the event details UI 132 depicts graphical representations of event details, and enables the user 140 to examine in-depth details for a specific event. Example in-depth details can include a list of users who most often performed/experienced the respective event, and a list of events commonly associated with the respective event.

In some implementations, each event profile 118 is provided based on the historical data 104. In some examples, an event profile 118 is provided as a predictive model (e.g., calculated from the historical data). In some examples, the predictive model is based on one or more equations used in classification models, which equations calculate several scores (e.g., impact, influence, days-to-churn). In some examples, features of the predictive model are based on the transactions/activities performed/experienced by the user (e.g., user experienced ATM cash jam (Yes/No)).

In some examples, and as described in further detail herein, each pulse 120 is provided based on event profile(s) 118. In some examples, each event is represented by a respective event profile 118. In some examples, an event represents one or more activities performed by a user with the system (e.g., one or more interactions between the user and the system). In some examples, each event is associated with a time (e.g., day/time event occurred), or a time range (e.g., range of days/times, over which activit(y/ies) occurred).

In some implementations, each event profile 118 includes an impact score, an influence score, a value representing "days-to-churn" (e.g., estimated days until a user will no longer use the respective system), one or more filters, and churn type. Example churn types include hard churn and soft churn. In some examples, hard churn is an event, through which a user ceases to be a user of the system (e.g., the user closes their account). In some examples, soft churn is an event, through which the user exhibits behavior that is indicative of churn, but the user has not yet ceased to be a user of the system (e.g., the user has not closed their account, but there is a period of inactivity).

In some implementations, the impact score represents the impact a particular event has on churn. In some examples, the impact score (e.g., expressed as an integer) is determined as the sum of churned users who performed the respective event during a training period. In some implementations, the influence score represents the influence a particular event has on churn across a plurality of users. In some examples, the influence score (e.g., expressed as a percentage) is determined by dividing the impact score by the total number of users, who performed the respective event during the training period. In some implementations, the training period is a time period that specifies the data range for determining the impact score and the influence score. For example, the training period is a time period over which historical data is selected (e.g., historical data within the training period is used for calculations).

In some implementations, the base analysis module 108 processes the historical data 104 to provide the event profiles 118. In some implementations, the base analysis module 108 provides an impact score and an influence score that are associated with a particular event.

In some implementations, the pulse module 114 reads in the pulse 120 (e.g., as a computer-readable file), and processes the pulse 120 to provide pulse output data. In some examples, the pulse output data is provided to the pulse UI 134, which processes the pulse output data to provide one or more graphical representations. In some examples, the pulse module 114 notifies the risk index module 116 of updates to the pulse 120. In some implementations, the pulse UI 134 displays graphical representations of pulse data, and enables the user 140 to examine the pulse 120 of a particular user.

In some implementations, the pulse 120 is provided as a set of influence values for a respective user during a specified period of time. In some examples, the pulse 120 may fluctuate over time depending on the events performed/experienced by the user interacting with the system. In some examples, the pulse is a user-specific, time-based series of influence scores, reflecting the events performed by that particular user. In some implementations, the real-time analysis module 110 reads in historical data 104 (e.g., provided in one or more computer-readable files), event profiles 118 (e.g., provided in one or more computer-readable files), and the real-time data 106 to provide a pulse 120 for a respective user. In some examples, the real-time analysis module 110 continuously receives the real-time data 106 for new data, and updates the pulse 120 accordingly.

In some implementations, the historical data 104 includes one or more data sources (e.g., external data sources) that each provides data for pre-processing the pulse 120. For example, and as described in further detail herein, the historical data 104 is processed to provide event profiles 118 and to initialize a pulse 120 for a respective user. In some examples, the historical data 104 can include data for current users (e.g., users, for which a risk of churn is being determined), and/or data for churned users (e.g., users that have already ceased to be users of the system). In some examples, the historical data 104 is provided as relatively recent data (e.g., a time associated with the data is within a first threshold difference of a current time (time at which event profile and/or pulse are to be provided)). In some examples, the historical data 104 is not the latest data (e.g., the time associated with the data exceeds a second threshold difference (greater than the first threshold difference) of the current time). Example historical data include transaction data (e.g., data representative of interactions a user has had with a system), and service data (e.g., data representative of interactions a user has had with support and/or service).

In some implementations, the real-time data 106 includes one or more data sources (e.g., external data sources) that each provides data for real-time analysis (e.g., continuously updating the pulse for the user). In some examples, the real-time data is provided as the most recent data (e.g., a time associated with the data is within a third threshold difference (lower than the first threshold difference) of a current time. In some examples, real-time data is provided as data associated with a user that was received after a pulse was determined for the user, and is sued to update the pulse. Example real-time data includes transaction data (e.g., data representative of interactions a user has had with a system), and service data (e.g., data representative of interactions a user has had with support and/or service).

In some implementations, the risk index module 116 continuously monitors the pulse 120, and determines when the pulse 120 meets (e.g., is equal to, exceeds) a risk index level 122. In some examples, the risk index level 122 signifies a risk that the user will churn, and can be configured by the enterprise. In some examples, the risk index level 122 is provided as a threshold influence score, and/or can include low risk, medium risk, high risk, and action required. In some examples, if the pulse 120 meets the risk index level 122, the risk index module 116 triggers an alert (e.g., indicating that the user is identified as "at risk" of churn). In some examples, the risk index module 116 receives the pulse 120 from the pulse module 114. In some implementations, the alert is provided to the at-risk UI 136, which processes the alert to provide a graphical representation of the alert, as described in further detail herein.

Figure 2:
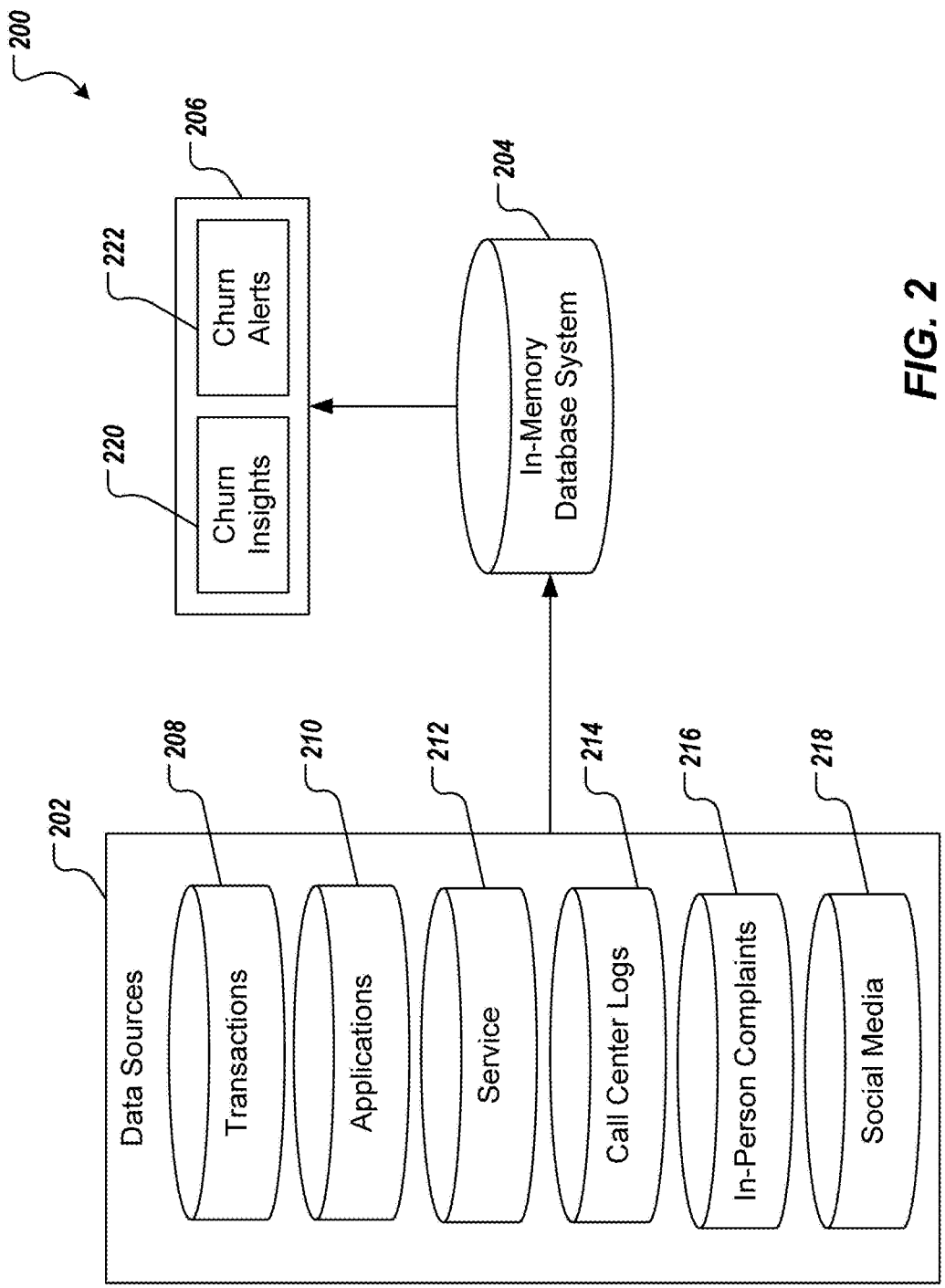
FIG. 2 depicts an example conceptual diagram in accordance with implementations of the present disclosure.

FIG. 2 depicts an example conceptual diagram in accordance with implementations of the present disclosure. In the example of FIG. 2, an example system 200 is depicted and includes data sources 202, an in-memory database systems 204, and churn analysis results 206. In some examples, the system 200 is a higher-level representation of the example system architecture 100 of FIG. 1. For example, the data sources 202 can be representative of the historical data 104 and/or the real-time data 106 of FIG. 1. In the depicted example, the data sources 202 include transactions 208, applications 210, service 212, call center logs 214, in-person complaints 216, and social media 218. For example, the transactions 208 can include historical data representative of transactions (interactions) that all users of the system have had with the system, as well as real-time data representative of current or recent transactions users are having or have had with the system. As another example, applications 210 can include historical data representative of interactions that all users of the system have had with the system using applications (e.g., web-based applications, mobile application), as well as real-time data representative of current or recent interactions users are having or have had with the system.

In some implementations, a data source 202 can include third-party data sources. For example, the social media 218 can include data provided from one or more computer-implemented social networking services (e.g., Instagram, Facebook, Twitter, Google+). In some examples, the social media 218 can include data representative of comments posted to the one or more social networking services (e.g., complaints about the enterprise, compliments about the enterprise). In some examples, posts shared on social networking services can be publically available and searchable, such that the enterprise can review posts to identify posts that are about the enterprise. In this manner, relevant social media can be extracted from the third-party service and stored in the social media 218. In some examples, particular social posts can be associated with specific users. For example, a user identifier (e.g., username, handle) of a social networking system can be associated with a user identifier of a user of the system (provided by the enterprise).

In some implementations, the in-memory database system 204 processes historical data and/or real-time data to provide the churn analysis results 206. For example, the in-memory database system 204 can execute one or more of the modules of FIG. 1 (e.g., the base analysis module 108, the real-time analysis module 110, the event analysis module 112, the pulse module 114, the risk index module 116). In the depicted example, the churn analysis results 206 include churn insights 220 and churn alerts 222. In some examples, churn insights 220 can include events and event details (e.g., discussed in further detail below with reference to FIGS. 3A and 3B). In some examples, churn alerts can include alerts that are triggered in response to determining that one or more users are at risk of churn (e.g., discussed in further detail below with reference to FIGS. 3C and 3D).

The in-memory database system 204 uses main memory for data storage. Main memory may include one or more types of random access memory (RAM) that communicates with one or more processors (e.g., CPU(s)), over a memory bus. An in-memory database system may be contrasted with database management systems that employ a disk storage mechanism. In some examples, in-memory database systems may be faster than disk storage databases, because internal optimization algorithms may be simpler and execute fewer CPU instructions. In some examples, accessing data in an in-memory database system may reduce or eliminate seek time when querying the data, providing faster and more predictable performance than disk-storage databases. An in-memory database may include a row-oriented database, in which data is stored in any number of rows or records. An in-memory database may also include a column-oriented in-memory database, in which data tables are stored as sections of columns of data (rather than as rows of data). An example in-memory database system is HANA™, provided by SAP™ SE of Walldorf, Germany.

In general, implementations of the present disclosure process historical data to determine events that have resulted in user churn. In some examples, a single event can result in user churn, or a series of events can result in user churn. For example, two or more events causing, or symptomatic of user churn can be correlated (example correlated events are provided below).

In some examples, an event profile is specific to an event (e.g. a single activity, a sequence of activities). The event profile includes the impact score, influence score, and days-to-churn for the event. In some examples, an event profile is used to predict is the likelihood of an existing user to churn, if the user performs/experiences the respective event. In some examples, the impact score for a particular event is determined as the number of users that have churned and that had performed/experienced the event. In some examples, the influence score for a particular event is determined as a ratio of the number of churned users that performed/experienced the event, and the total number of users that performed/experienced the event. In some examples, for each churned user that performed/experienced a particular event, the number of days between when the event was performed/experienced and the date the user churned is determined. In some examples, the days-to-churn for the event is provided as the average number of days between across all churned users that performed/experienced the event.

In some examples, a pulse is provided for each user. For each event performed by a particular user, the influence score (from the corresponding event profile) is used to generate the pulse (e.g., influence score plotted over time).

FIGS. 3A-3D depict example graphical user interfaces (GUIs) in accordance with implementations of the present disclosure. The examples of FIGS. 3A-3D are based on an example use case, which includes users as customers of a financial services enterprise. It is contemplated, however, that implementations of the present disclosure can be realized with any appropriate type of enterprise providing any appropriate type of products and/or services.

Figure 3A:
FIGS. 3A-3D depict example graphical user interfaces (GUIs) in accordance with implementations of the present disclosure.

FIG. 3A depicts an example event overview UI 300. The example event overview UI 300 includes a tabular event summary 302, and a graphical event summary 304. The tabular event summary 302 provides a list of event types, and their respective impact scores and influence scores. In the depicted example, the event types are listed in rank order based on impact score. Color coding is provided based on influence score to indicate event types having high influence, medium influence, and low influence on user churn. In accordance with the example context, event types depicted in the example of FIG. 3A include:

"No Payroll/Salary For 2 Months" (no payroll/salary deposits into account in the last 2 months), with an impact score of 2 million (2 m) (e.g., rounded up from a lower value), and an influence score of 40%;

"80% Transactions Drop Over 3 Months" (reduction in deposits/withdrawals into/from account in 3 month period), with an impact score of 2 million (2 m) (e.g., rounded up from a lower value), and an influence score of 40%;

"Standing Order" (a set amount to pay into another account at regular intervals), with an impact score of 625,000 (625 k), and an influence score of 10%;

"Priority Order Internet Banking" (an expedited payment order placed using Internet banking), with an impact score of 466,000 (466 k), and an influence score of 8%; and "Point-of-Sale Transaction" (charging from an account at a point-of-sale (e.g., using a debit card), with an impact score of 454,000 (454 k), and an influence score of 11%.

The example event types indicate that the event types "No Payroll/Salary For 2 Months" and "80% Transactions Drop Over 3 Months" have the highest impact and influence on user churn. The example event types also illustrated that, although an event type may have a higher impact score than another event type, it may have a lower influence on user churn. For example, "Priority Order Internet Banking" has an impact score of 466 k and an influence score of 8%, while "Point-of-Sale Transaction" has a lower impact score of 454 k, but a higher influence score of 11%.

In the example of FIG. 3A, the example graphical event summary 304 includes a set of circles, each circle representing an event type. In the depicted example, a diameter of each circle is based on a respective impact score, event types having a larger impact score having a larger diameter than event types having a lower impact score. In the depicted example, the circles are color coded based on influence score to indicate event types having high influence, medium influence, and low influence on user churn. In some examples, a detail interface 306 can be displayed for a respective event type. For example, if a user viewing the event overview UI 300 selects (e.g., clicks on, hovers over) a circle of the example graphical event summary 304, a respective detail interface 306 can be displayed. In the depicted example, the example detail interface 306 identifies the event type, the impact score (e.g., 1.92 m, rounded up to 2 m in the tabular event summary 302), and the influence score.

Figure 3B:
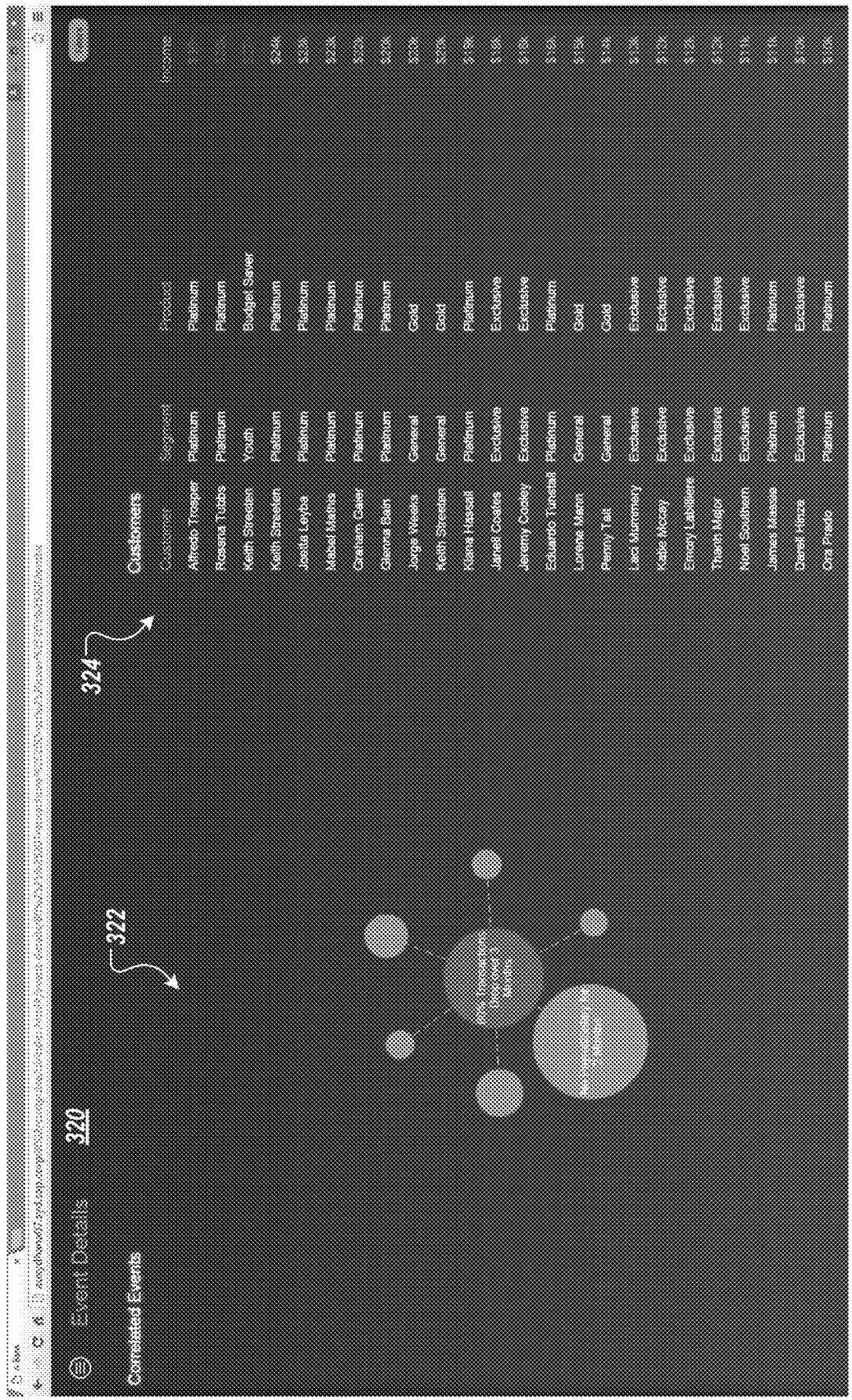

FIG. 3B depicts an example event details UI 320. The example event details UI 320 includes a graphical representation of correlated events 322 and a tabular user summary 324. In some examples, the event details UI 320 is displayed in response to user selection of a particular event from the event overview UI 300. In the example of FIG. 3B, the event details UI 320 depicts details of the "80% Transactions Drop Over 3 Months" (e.g., selected by the user in the event overview UI 300).

The example graphical representation of correlated events 322 includes a central circle representing the selected event type (e.g., the event type that is the subject of the event details UI 320), and satellite circles, each representing a respective event type that has been correlated to the selected event type. In some examples, a diameter of a satellite circle indicates a level of correlation to the selected event type. For example, satellite circles having a larger diameter are more highly correlated to the selected event type than satellite circles having a smaller diameter. The example tabular user summary 324 includes a list of users that are associated with the selected event type (e.g., that have an event matching the selected event type). In some examples, characteristics include user name, a segment and a product the user is associated with, and an income of the user. In some examples, income values can be color-coded to indicate relative level of income (e.g., high, medium, low).

Figure 3C:
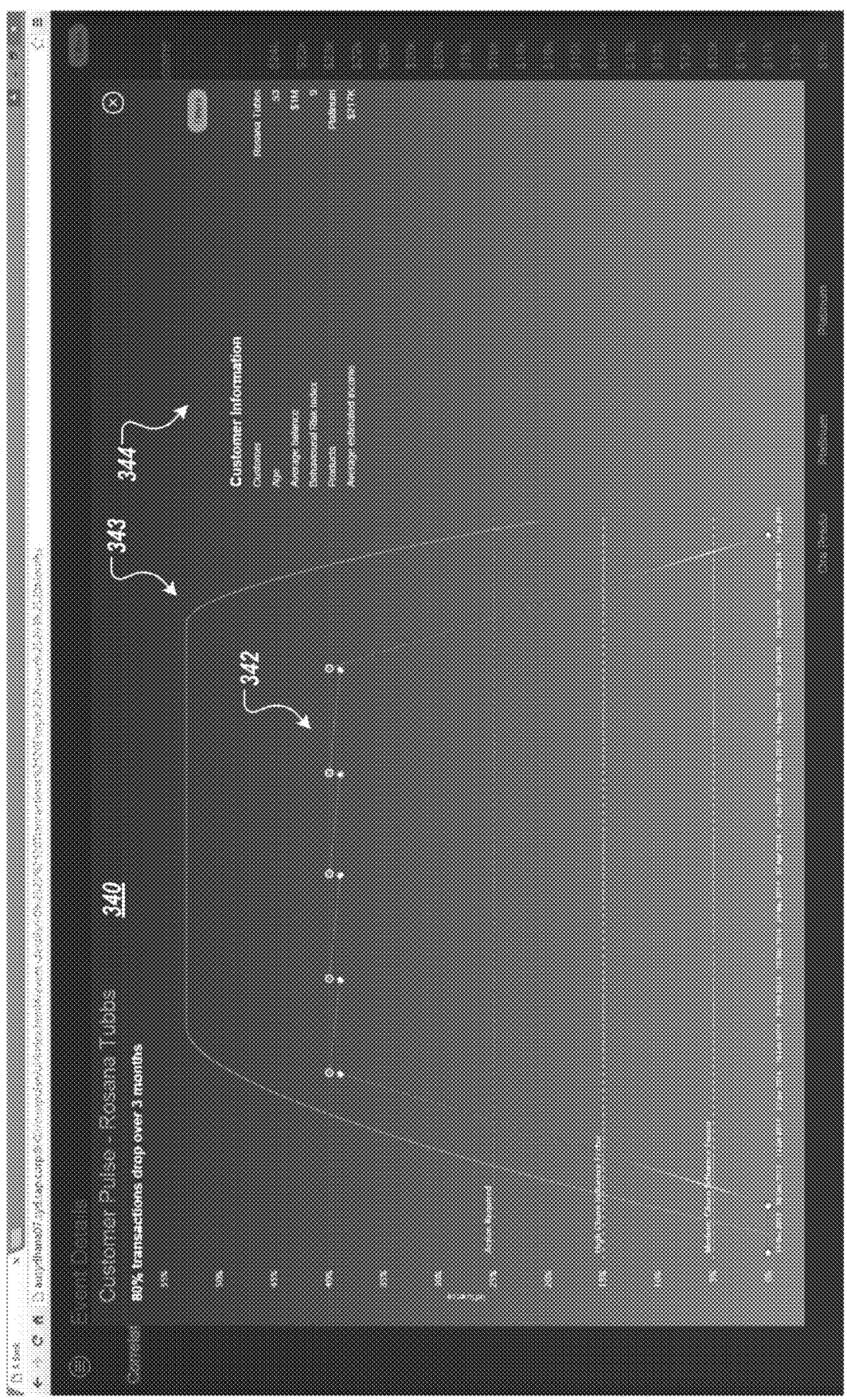

FIG. 3C depicts an example pulse UI 340. The example pulse UI 340 corresponds to a particular user (e.g., selected from the tabular user summary 324 of the event details UI 320 of FIG. 3B), and the pulse determined for the particular user. The example pulse UI 340 includes graphical representations of a pulse line 342 and a trend line 343, and a tabular summary of customer information 344. In some examples, the pulse line 342 corresponds to a particular user, and individual points on the pulse line correspond to the influence score of a respective event. In the depicted example, points on the pulse line 342 that are highlighted in blue reflect the event "80% Transactions Drop Over 3 Months." In this example, these points are at the peaks of the pulse line 342. The graphical representation also includes multiple threshold lines for the influence score (e.g., 5% —Medium Churn Influence Factor; 15% High Churn Influence Factor; 25% —Action Required).

Figure 3D:
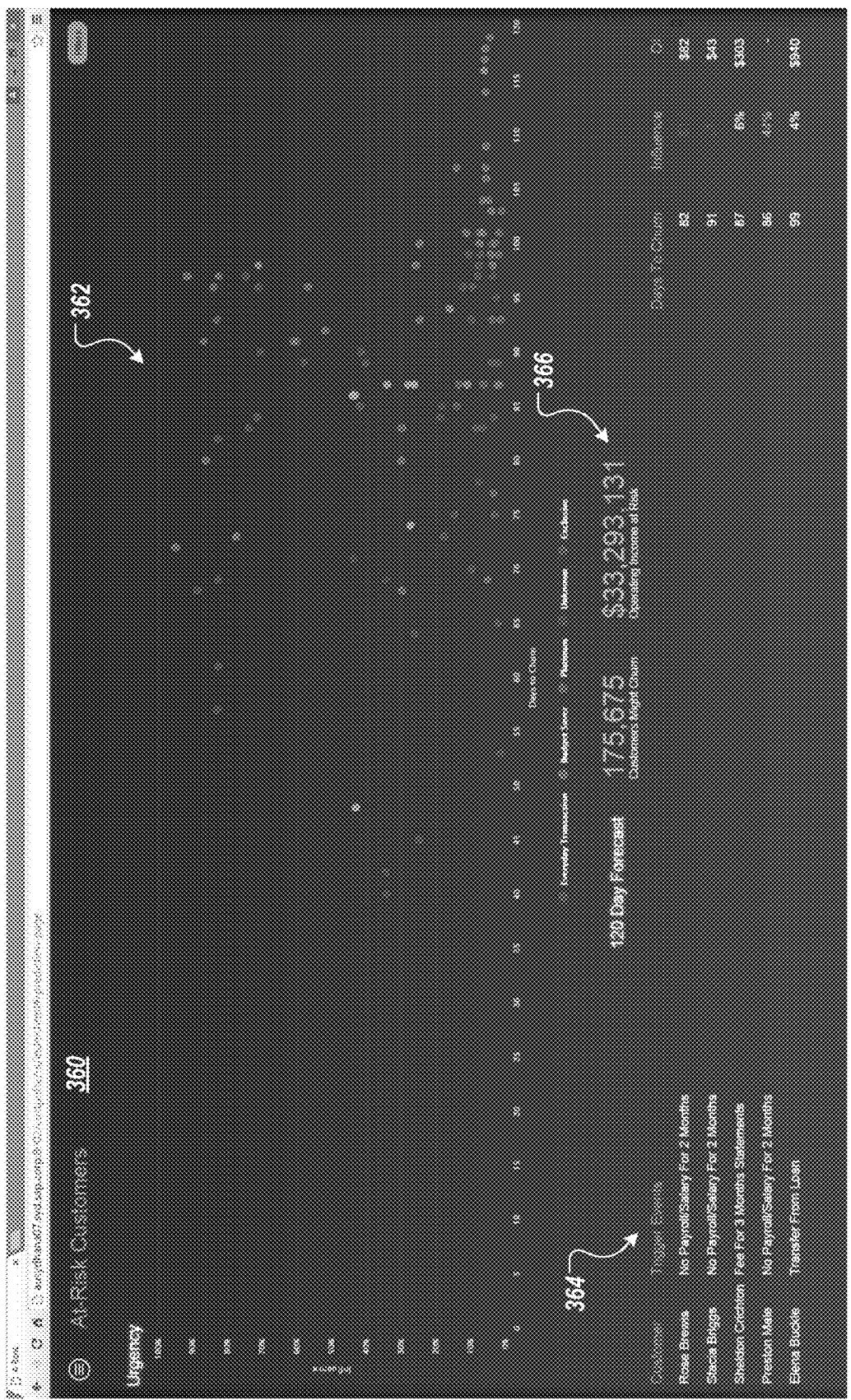

FIG. 3D depicts an example at-risk UI 360, which provides information regarding users that have been determined to be at-risk of churn. The example at-risk UI 360 includes a graphical representation of urgency 362, and a tabular user summary 364. In the depicted example, the graphical representation of urgency 362 includes a scatter chart having an X-axis representing "Days to Churn" and a Y-axis representing influence score. In the depicted example, each dot of the scatter graph represents a category of user (as color-coded), and can be representative of one or more users. For example, a dot located at 45 days to churn, and 25% influence score can represent a single user, while a dot located at 64 days to churn, and 27% influence score can represent multiple users. In the depicted example, the at-risk UI provides a tabular summary 366 indicating a number of users that are at-risk of churn, and an impact (e.g., economic) for the forecast displayed in the graphical representation of urgency 362. In some examples, the economic impact is determined as the sum of the operating income (OI), discussed below, of the predicted at-risk users.

In the depicted example, the tabular user summary 364 provides a list of user names, and for each user, an associated trigger event, an estimated days-to-churn, an influence score, and an OI. In some examples, the OI is provided as the total fees/charges that the user paid to the entity (e.g., bank), less interest paid by the entity to the user. In some examples, the OI is determined on a monthly basis, and is averaged across the previous 12 months.

In some examples, the trigger event is an event type that has been used to determine that the particular user is at-risk of churn. In some examples, the trigger event is the most recent event that caused the pulse to achieve the threshold (e.g., "Action Required" threshold of FIG. 3C). In the example of FIG. 3D, the influence scores reflect the most recent event performed/experienced by the user (which are not necessarily trigger events).

Figure 4:
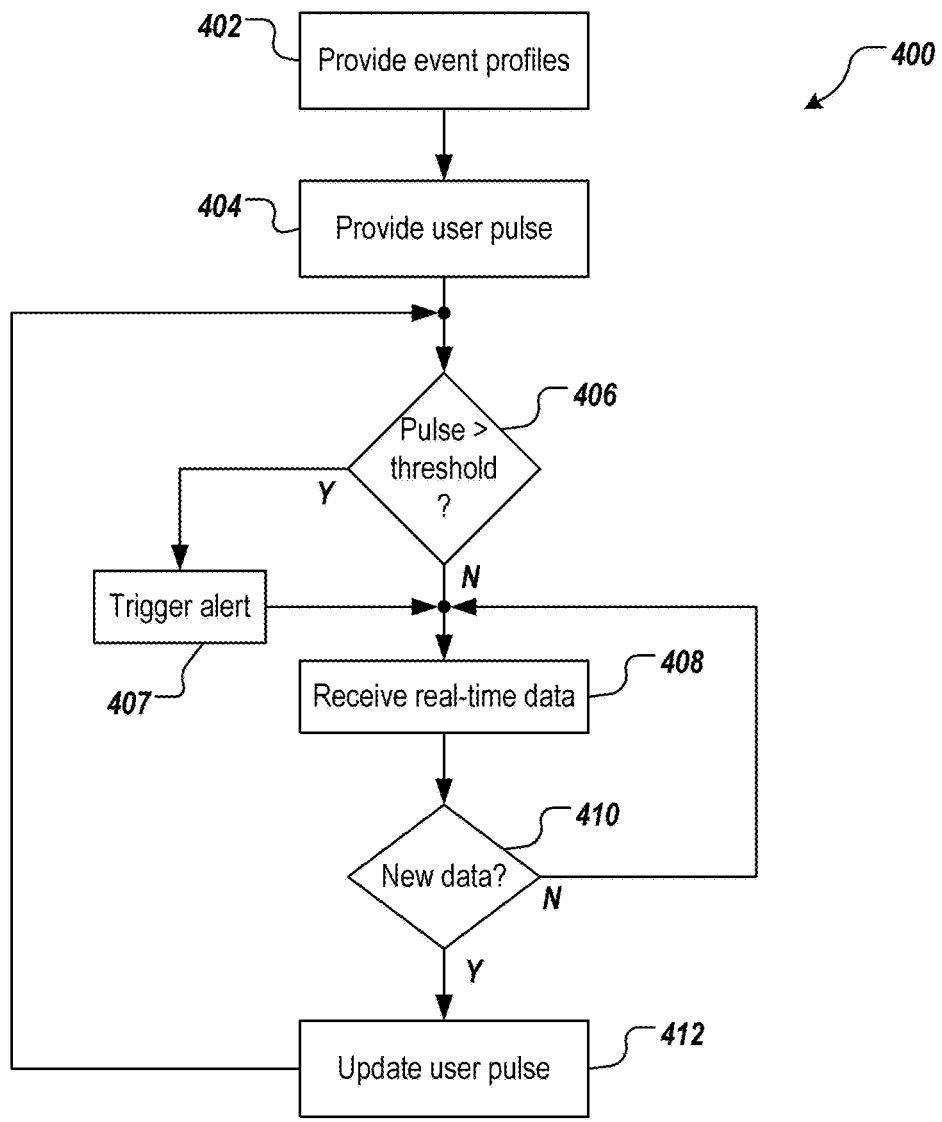
FIG. 4 is a flowchart illustrating an example process that can be executed in implementations of the present disclosure.

FIG. 4 is a flowchart illustrating an example process 400 that can be executed in implementations of the present disclosure. In some implementations, the example process 400 can be realized using one or more computer-executable programs that are executed using one or more computing devices. In some examples, the example process 400 is performed to monitor users of a system (e.g., products/services provided by an enterprise) for churn. In some examples, the example process 400 is executed for each user of a plurality of users.

Event profiles are provided (402). For example, event profiles are determined based on historical data. In some examples, the base analysis module 108 provides the event profiles 118 based on the historical data 104 (see FIG. 1). As described herein, an event profile is associated with a respective event and includes an impact score, an influence score, and a days-to-churn for the particular event. In some examples, an event profile is used to predict is the likelihood of an existing user to churn, if the user performs/experiences the respective event. In some examples, the impact score for a particular event is determined as the number of users that have churned and that had performed/experienced the event. In some examples, the influence score for a particular event is determined as a ratio of the number of churned users that performed/experienced the event, and the total number of users that performed/experienced the event. In some examples, for each churned user that performed/experienced a particular event, the number of days between when the event was performed/experienced and the date the user churned is determined. In some examples, the days-to-churn for the event is provided as the average number of days between across all churned users that performed/experienced the event. Accordingly, event profiles are determined across all users of the system, and are not specific to a particular user.

A pulse is provided for a particular user (404). For example, a pulse is provided based on one or more event profiles, historical data, and real-time data. In some examples, the real-time analysis module 110 provides the pulse 120 based on one or more event profiles 118, the historical data 104, and the real-time data 106 (see FIG. 1). As described herein, a pulse is provided for a user based on events performed/experienced by the user. For each event performed/experienced by the user, the influence score (from the corresponding event profile) is used to determine the pulse (e.g., influence score plotted over time). Accordingly, a pulse is specific to a particular user.

It is determined whether the pulse meets (e.g., is equal to, is greater than) a threshold (406). For example, the pulse is compared to a risk index level to determine whether the pulse meets (e.g., is equal to, exceeds) the risk index level. In some examples, the risk index module 116 continuously monitors the pulse 120, and determines when the pulse 120 meets (e.g., is equal to, exceeds) the risk index level 122 (see FIG. 1). If the pulse meets the threshold, an alert is triggered (407). For example, a graphical representation of a user can be included in an at-risk UI (e.g., the at-risk UI 136 of FIG. 1, the at-risk UI 360 of FIG. 3D).

Real-time data is received (408). For example, data is received from one or more data sources (e.g., one or more of the data sources 202 of FIG. 2). In some examples, the real-time data is data associated with the particular user that the pulse is specific to. It is determined whether new data is provided (410). For example, it is determined whether data used to determine the pulse, or that could be used to update the pulse provided. If new data is not provided, the example process 400 loops back. If new data is provided, the pulse is updated (412). For example, the pulse is updated based on one or more event profiles, historical data, and newly provided real-time data. In some examples, the real-time analysis module 110 updates the pulse 120 (see FIG. 1).

Figure 5:
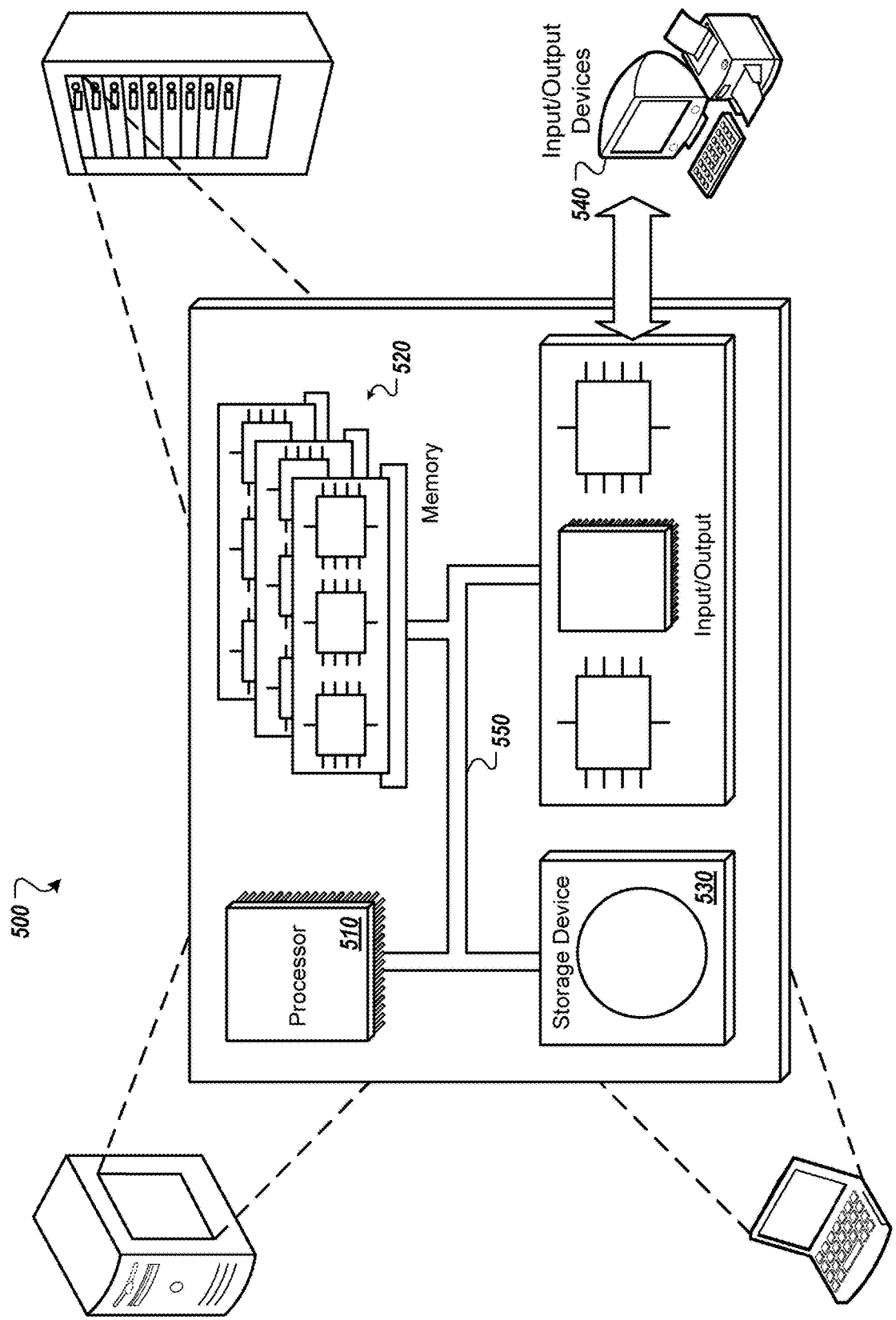
FIG. 5 is a schematic illustration of example computer systems that can be used to execute implementations of the present disclosure.

FIG. 5 is a schematic illustration of example computer systems 500 that can be used to execute implementations of the present disclosure. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for identifying potential churn of a user of one or more computer-implemented systems provided by an enterprise, the method being executed using one or more processors and comprising:
   providing, by the one or more processors, a plurality of event profiles based on historical data, each event profile being representative of interactions of users with one or more computer-implemented services of the enterprise and corresponding to churn of the users, at least one event profile being representative of an interaction of users with the one or more computer-implemented services of the enterprise;
   providing, by the one or more processors, a pulse of the user at least partially based on historical data associated with the user, and one or more event profiles of the plurality of event profiles, the historical data being representative of interactions of the user with the one or more computer-implemented services, the pulse comprising a user-specific, time-based series of influence scores based on events performed by the user;
   determining, by the one or more processors, that the pulse of the user is below a risk index level, and in response:
   receiving real-time data that is specific to the user; and
   determining that the real-time data comprises new data, and in response:
   updating the pulse of the user, and
   determining that the pulse meets the risk index level, and in response, determining that the user is at-risk of churn, and displaying an indication that the user is at-risk of churn in a graphical user interface.

2. The method of claim 1, wherein each event profile is representative of an event associated with a plurality of churned users, each churned user having performed or experienced the event before churning.

3. The method of claim 2, wherein each event profile comprises an impact score, an influence score, and a days-to-churn for the respective event.

4. The method of claim 3, wherein the impact score is determined as a number of users that have churned and that are associated with the respective event.

5. The method of claim 3, wherein the influence score is determined as a ratio of a number of churned users that are associated with the respective event to a total number of users that are associated with the respective event.

6. The method of claim 3, wherein the days-to-churn is determined based on:
   for each churned user that is associated with the respective event, the number of days between when the respective event was experienced by the churned user and the date the user churned, and
   averaging the days-to-churn across all churned users that are associated with the event.

7. The method of claim 1, wherein the pulse is determined based on at least one influence score of an event associated with the user.

8. A non-transitory computer-readable storage medium coupled to one or more processors and having instructions stored thereon which, when executed by the one or more processors, cause the one or more processors to perform operations for identifying potential churn of a user of one or more computer-implemented systems provided by an enterprise, the operations comprising:
   providing a plurality of event profiles based on historical data, each event profile being representative of interactions of users with one or more computer-implemented services of the enterprise and corresponding to churn of the users, at least one event profile being representative of an interaction of users with the one or more computer-implemented services of the enterprise;
   providing a pulse of the user at least partially based on historical data associated with the user, and one or more event profiles of the plurality of event profiles, the historical data being representative of interactions of the user with the one or more computer-implemented services, the pulse comprising a user-specific, time-based series of influence scores based on events performed by the user;
   determining that the pulse of the user is below a risk index level, and in response:
   receiving real-time data that is specific to the user; and
   determining that the real-time data comprises new data, and in response:
   updating the pulse of the user, and
   determining that the pulse meets the risk index level, and in response, determining that the user is at-risk of churn, and displaying an indication that the user is at-risk of churn in a graphical user interface.

9. The computer-readable storage medium of claim 8, wherein each event profile is representative of an event associated with a plurality of churned users, each churned user having performed or experienced the event before churning.

10. The computer-readable storage medium of claim 9, wherein each event profile comprises an impact score, an influence score, and a days-to-churn for the respective event.

11. The computer-readable storage medium of claim 10, wherein the impact score is determined as a number of users that have churned and that are associated with the respective event.

12. The computer-readable storage medium of claim 10, wherein the influence score is determined as a ratio of a number of churned users that are associated with the respective event to a total number of users that are associated with the respective event.

13. The computer-readable storage medium of claim 10, wherein the days-to-churn is determined based on:
   for each churned user that is associated with the respective event, the number of days between when the respective event was experienced by the churned user and the date the user churned, and
   averaging the days-to-churn across all churned users that are associated with the event.

14. The computer-readable storage medium of claim 8, wherein the pulse is determined based on at least one influence score of an event associated with the user.

15. A system, comprising:
   a computing device; and
   a computer-readable storage device coupled to the computing device and having instructions stored thereon which, when executed by the computing device, cause the computing device to perform operations for identifying potential churn of a user of one or more computer-implemented systems provided by an enterprise, the operations comprising:

providing a plurality of event profiles based on historical data, each event profile being representative of interactions of users with one or more computer-implemented services of the enterprise and corresponding to churn of the users, at least one event profile being representative of an interaction of users with the one or more computer-implemented services of the enterprise;

providing a pulse of the user at least partially based on historical data associated with the user, and one or more event profiles of the plurality of event profiles, the historical data being representative of interactions of the user with the one or more computer-implemented services, the pulse comprising a user-specific, time-based series of influence scores based on events performed by the user;

determining that the pulse of the user is below a risk index level, and in response:
   receiving real-time data that is specific to the user; and determining that the real-time data comprises new data, and in response:
   updating the pulse of the user, and
   determining that the pulse meets the risk index level, and in response, determining that the user is at-risk of churn, and displaying an indication that the user is at-risk of churn in a graphical user interface.

16. The system of claim 15, wherein each event profile is representative of an event associated with a plurality of churned users, each churned user having performed or experienced the event before churning.

17. The system of claim 16, wherein each event profile comprises an impact score, an influence score, and a days-to-churn for the respective event.

18. The system of claim 17, wherein the impact score is determined as a number of users that have churned and that are associated with the respective event.

19. The system of claim 17, wherein the influence score is determined as a ratio of a number of churned users that are associated with the respective event to a total number of users that are associated with the respective event.

20. The system of claim 17, wherein the days-to-churn is determined based on:
   for each churned user that is associated with the respective event, the number of days between when the respective event was experienced by the churned user and the date the user churned, and
   averaging the days-to-churn across all churned users that are associated with the event.

* * * * *